June 26, 1934.  J. A. TREASE  1,964,653
ANIMAL RESTRAINING DEVICE
Filed July 18, 1933  2 Sheets-Sheet 1

Inventor
J. A. Trease

By Clarence A. O'Brien
Attorney

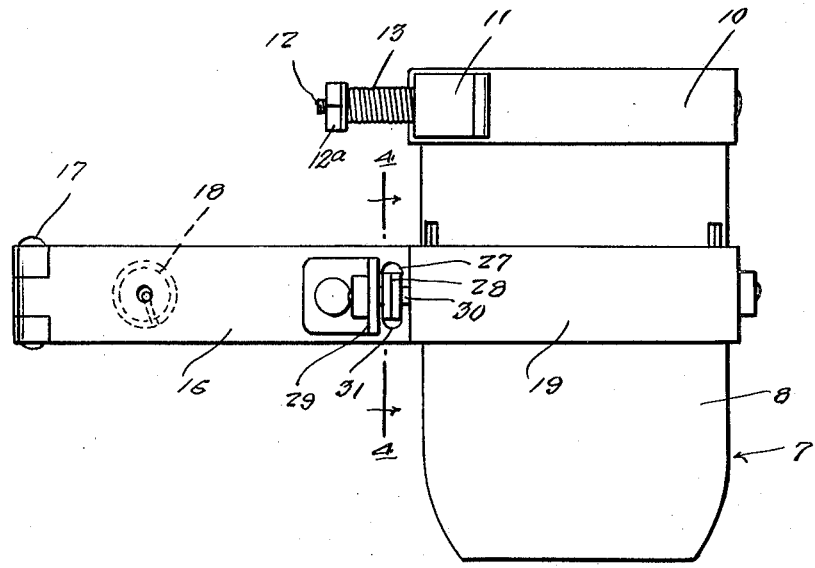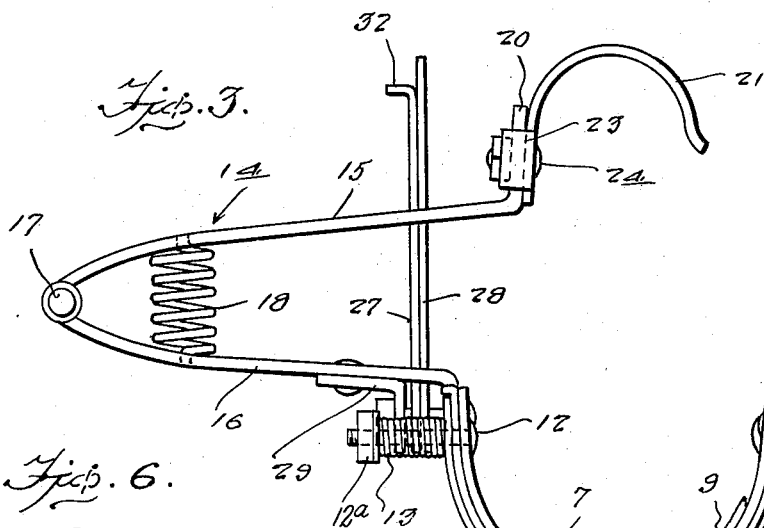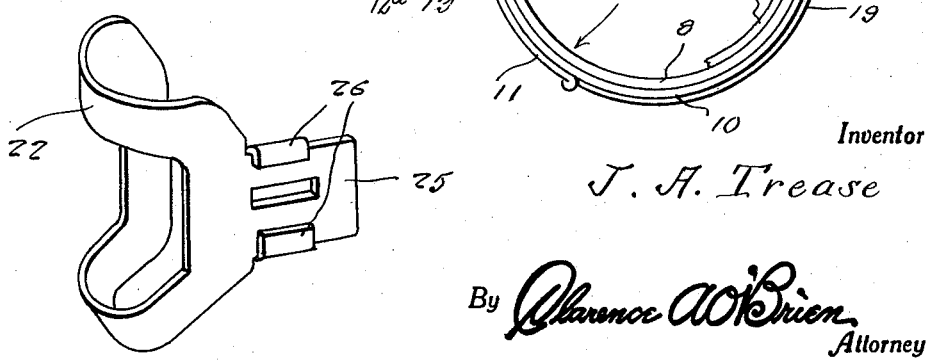

Patented June 26, 1934

1,964,653

UNITED STATES PATENT OFFICE 1,964,653

ANIMAL RESTRAINING DEVICE

Joshua A. Trease, Orchard, Nebr.

Application July 18, 1933, Serial No. 681,014

4 Claims. (Cl. 119—127)

This invention relates to an improved animal restraining device in the nature of an especially constructed appliance designed and adapted to embrace the leg of an animal, for example, a milch-cow, in a manner to prevent the cow from kicking.

The purpose of the invention is to provide an appliance of the aforesaid type, which is expressly constructed to co-operate with the gambrel-joint or hock in such a manner as to bridge the joint and thereby prevent bending of the leg and consequent disastrous kicking while the cow is being milked.

In perfecting the preferred embodiment of the invention, I have incorporated therein, a tail retention clip useful in holding the tail to prevent annoying switching thereof while the milking operation is carried on.

Moreover, I have evolved and produced an unusual and clever assembly of parts which when properly organized, provides a structural arrangement characterized by requisite comfort and maintenance properties and other features and advantages which qualify the device as a novel contribution to the art and the trade.

Other features and advantages will become more readily apparent from the following description and drawings.

In the drawings:

Figure 2 is a front elevational view thereof.

Figure 3 is a top plan view of the same.

Figure 6 is a perspective view of a modified adapter.

Figure 1:
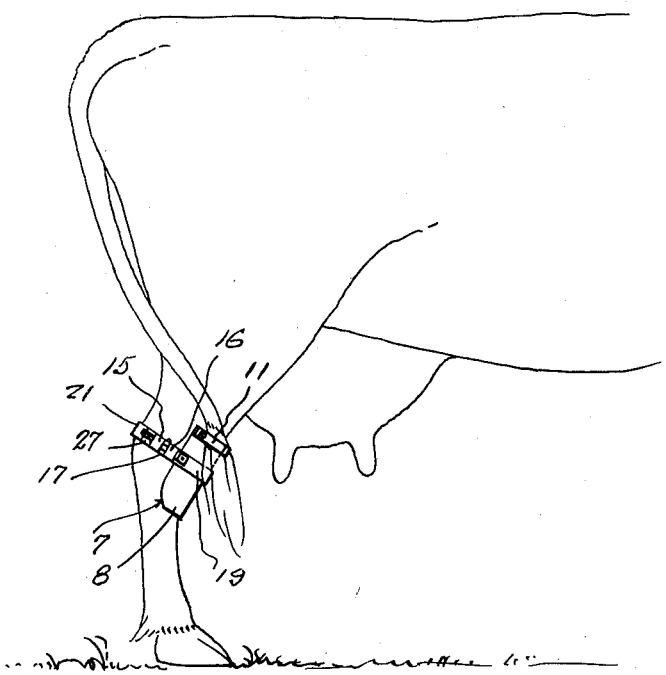
Figure 1 is a side elevational view of the device on a reduced scale showing the manner in which it is applied and used.

Referring now to the illustrative drawings by distinguishing reference characters, it will be noted that the numeral 7 designates the principal part of the restraining device which may be differentiated as a guard. This is preferably in the nature of a semi-cylindrical vertically elongated plate 8 provided at its interior with a protective pad or lining 9 to prevent chafing.

As shown in the side elevational view of Figure 1, the guard is sufficiently ample in proportion to bridge the frontal portion of the gambrel-joint and when clamped in place it absolutely prevents bending of the lower portion of the leg. A semi-circular band 10 is riveted or otherwise fastened to the upper portion of the plate for reinforcing purposes, and associated with one end of this is a tail-holding clip 11. The clip is properly shaped and slidably mounted on a bolt 12 and held in retaining position through the instrumentality of a yieldable coiled spring 13 which surrounds the bolt and bears against the nut 12a as shown in Figures 2 and 3.

Figure 4:
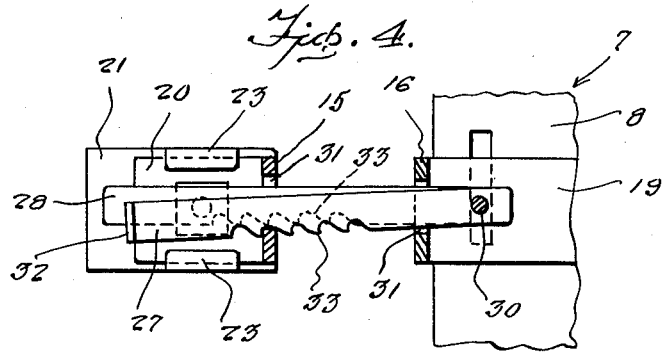
Figure 4 is a section taken approximately on the plane of the line 4—4 of Figure 2, looking in the direction of the arrow.
Figure 5:
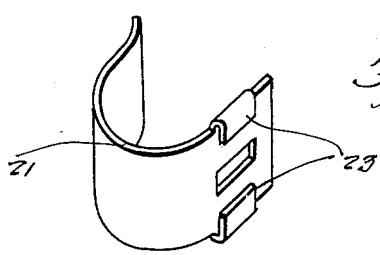
Figure 5 is a perspective view of one form of hock adapter.

I next call attention to the numeral 14 which designates the clamping unit. This comprises a pair of complemental sections 15 and 16 hingedly joined together as indicated at 17. A coiled expansion spring 18 is interposed between the hinged sections to spread said sections apart. The free end portion of the section 16 is provided with a semi-circular terminal portion 19 which is adjustably attached to the plate 8 as partially shown in Figure 4.

The free end of the section 16 is directed rearwardly and laterally as indicated at 20 and serves as a maintenance element for the special adapters which partially embrace the hock above the joint in the manner shown in Figure 1. There are two of these adapters and one is distinguished by the numeral 21 in Figure 3 and the other one by the numeral 22 in Figure 6. These are interchangeable.

The adapter 21 is provided with suspension hooks 23 which engage over the supporting tongue 20. A bolt 24 is used to detachably mount the adapter on this tongue. In Figure 6, the adapter 22 which is made to conform to the hock above and below the joint is provided with a companion tongue 25 adapted to be placed against the tongue 20, said tongue 25 having supporting hooks 26 which operate with the tongue 20 in an obvious manner.

The means for adjustably securing the adapter in place comprises a pair of substantially duplicate ratchet bars or arms 27 and 28 respectively. In Figure 2, it will be observed that the numeral 29 designates a bracket which serves to accommodate a pivot pin 30 on which the adjacent or forward ends of the two bars 27 and 28 are pivotally mounted. These bars extend through accommodation slots 31 formed in the clamp sections 15 and 16 (see Figure 4).

The bar 27 is formed at its free end with a laterally directed finger grip 32. It will be observed that the corresponding end of the bar 28 extends beyond the finger grip 32 so that the bars may be individually or selectively actuated. Moreover, both of these bars are provided with rack teeth 33, the teeth of the bar 27 being alternated or staggered with respect to those of the bar 28. This regulates the fineness of adjustment. One rack bar would of course operate but two rack bars are disposed in side-by-side relationship and regarded as more accurate and dependable.

The gist of the invention comprises a semi-cylindrical guard or restraining plate 8 carrying a substantially V-shaped clamp 14, one section of the clamp being fastened to the plate 8 and the other section being constructed to accommodate the interchangeable detachable adapters 21 and 22. Both of these sections are formed with registering slots to accommodate the side-by-side pivotally mounted rack and ratchet bars or arms 27 and 28. These bars when fastened down as shown in Figure 3 serve to resist the expansion action of the setting spring 18.

Under this arrangement it will be observed that the parts constituting the so-called guard and adapter are disposed in opposed spaced relationship with the part 8 located to embrace the frontal portion of the joint and the adapter arranged to engage over the hock whereby to position and retain the device in such a manner as to prevent bending of the leg of the cow and consequent objectionable and damaging kicking. The tail holder is of course an important but incidental feature of the invention.

Particular emphasis, however, is placed on the expansible and contractible sectional clamp 14 conveniently located to expedite application and removal of the device as a whole and the incorporation therein of the twin rack bars.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

I claim:

1. A leg restraining and anti-kicking appliance of the class described comprising a guard in the form of a vertically elongated semi-cylindrical plate adapted to embrace and bridge the frontal portion of the gambrel-joint, a pair of outwardly converging hingedly connected clamp sections, one section being attached at its free end portion to said guard, the free end of the remaining section being directed rearwardly and laterally to function as a suspension tongue, a substantially U-shaped adapter detachably connected with said tongue, an extension coiled spring interposed between the clamp sections to spread said sections apart, said clamp sections being formed with registering slots, and a pivotally mounted rack bar carried by one section and extending through the slots and engageable with one of said slots to retain the clamping sections in a predetermined relationship.

2. A leg restraining and anti-kick appliance of the class described comprising a guard, a pair of complemental clamp sections hingedly joined together at one end, one of the sections being attached at its opposite end to said guard, the corresponding end of the remaining clamp section being directed rearwardly and laterally to serve as a supporting tongue, and adapter, said adapter being substantially U-shaped in form and provided with a retaining bolt and hook detachably associated with said tongue, a coil spring interposed between and connected with said clamping sections to spread the sections apart, both of said sections being formed with slots, a bracket carried by the first-named section, and a pair of alternately operable rack bars pivotally attached to said bracket and extending through the slots, said bars being formed with staggered rack teeth for the purpose described.

3. A leg restraining and anti-kick appliance of the class described comprising a guard, an adapter for cooperation with the hock of the leg of the animal, a pair of substantially duplicate connecting and clamping sections hingedly connected together at their outer ends, the inner ends of said sections being connected with the guard and adapter respectively, there being an adjustable and detachable connection between the adapter and its complemental clamping section, and manually regulated connecting means between the intermediate portions of said clamping sections.

4. A leg restraining and anti-kick appliance of the type specified comprising a guard for cooperation with the frontal half portion of the gambrel-joint, a rearwardly spaced adapter engageable over the hock, a pair of substantially duplicate clamping sections hingedly connected together at their outer ends, the inner ends of said sections being connected with the guard and adapter respectively, a coiled spring interposed between and connected with the clamping sections to spread said sections apart, the intermediate portions of said sections being formed with registerable slots, a pair of alternately operable rack bars pivotally associated with one of said sections and extending through the slot, the rack bars being formed with staggered rack teeth to regulate the adjustment of said sections to the requisite degree.

JOSHUA A. TREASE.